United States Patent
Yamamoto et al.

[11] Patent Number: 5,399,124
[45] Date of Patent: Mar. 21, 1995

[54] AUTOTENSIONER

[75] Inventors: Ken Yamamoto; Morihisa Yoshioka, both of Shizuoka, Japan

[73] Assignee: NTN Corporation, Osaka, Japan

[21] Appl. No.: 211,629

[22] PCT Filed: Aug. 26, 1993

[86] PCT No.: PCT/JP93/01201
§ 371 Date: Apr. 20, 1994
§ 102(e) Date: Apr. 20, 1994

[87] PCT Pub. No.: WO94/05932
PCT Pub. Date: Mar. 17, 1994

[30] Foreign Application Priority Data
Aug. 28, 1992 [JP] Japan .................. 4-60726

[51] Int. Cl.⁶ .............................. F16H 7/12
[52] U.S. Cl. .................... 474/94; 474/112; 474/135
[58] Field of Search ............ 474/94, 112, 135, 101; 74/82, 568 R

[56] References Cited

U.S. PATENT DOCUMENTS

| | | | |
|---|---|---|---|
| 4,832,665 | 5/1989 | Kadota et al. | 474/112 |
| 4,904,230 | 2/1990 | Kawashima et al. | 474/112 |
| 4,923,435 | 5/1990 | Kadota et al. | 474/112 |
| 5,328,415 | 7/1994 | Furutani et al. | 474/135 X |

FOREIGN PATENT DOCUMENTS

| | | |
|---|---|---|
| 63-40657 | 3/1988 | Japan . |
| 63-303252 | 12/1988 | Japan . |
| 2445 | 1/1990 | Japan . |
| 4151051 | 5/1992 | Japan . |

*Primary Examiner*—Roger J. Schoeppel
*Attorney, Agent, or Firm*—Nikaido, Marmelstein Murray & Oram

[57] ABSTRACT

The object of this invention is to reduce the cost of an autotensioner for keeping constant the tension of a belt.

A pulley 13 is mounted on the pulley support 6 eccentrically supported by the support shaft 3. A tension imparting member is provided which rocks the pulley support in a direction in which the pulley stretches a belt. The pulley support 6 has a cylindrical portion 8a which is concentrical with the support shaft. Damper 20 is provided between the cylindrical portion 8a and the support shaft 3 to impart a rocking resistance to the pulley support. The pulley support 6 has an eccentric ring 7 and a rocking shaft 8. The rocking shaft has at one end the cylindrical portion 8a and at the other end a cylindrical small-diameter portion 8b which is inserted in the eccentric ring. The pulley support 6 is comprised of two members which are simple in shape and easy to manufacture.

2 Claims, 4 Drawing Sheets

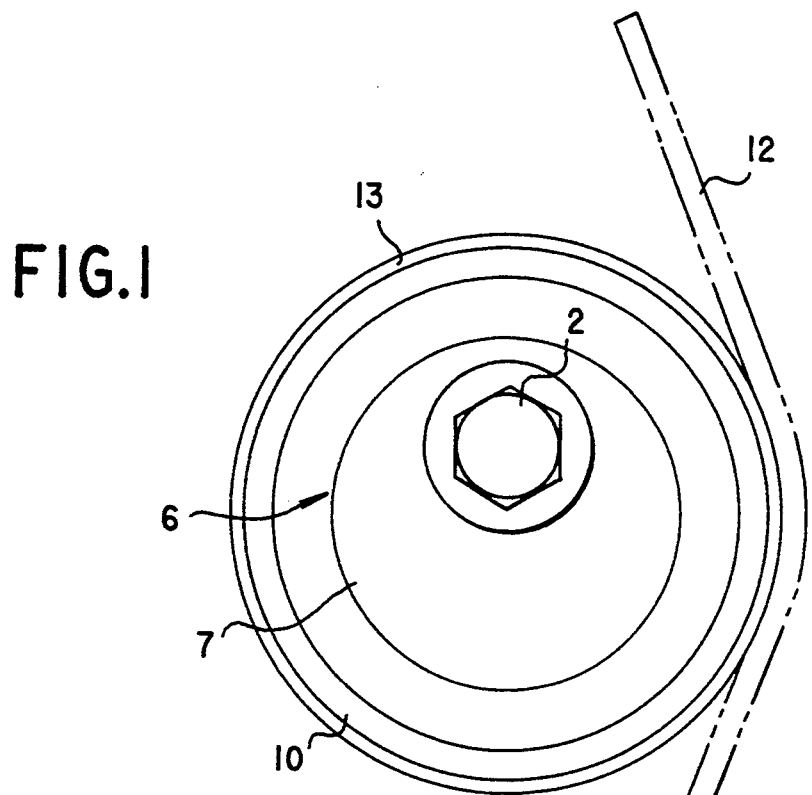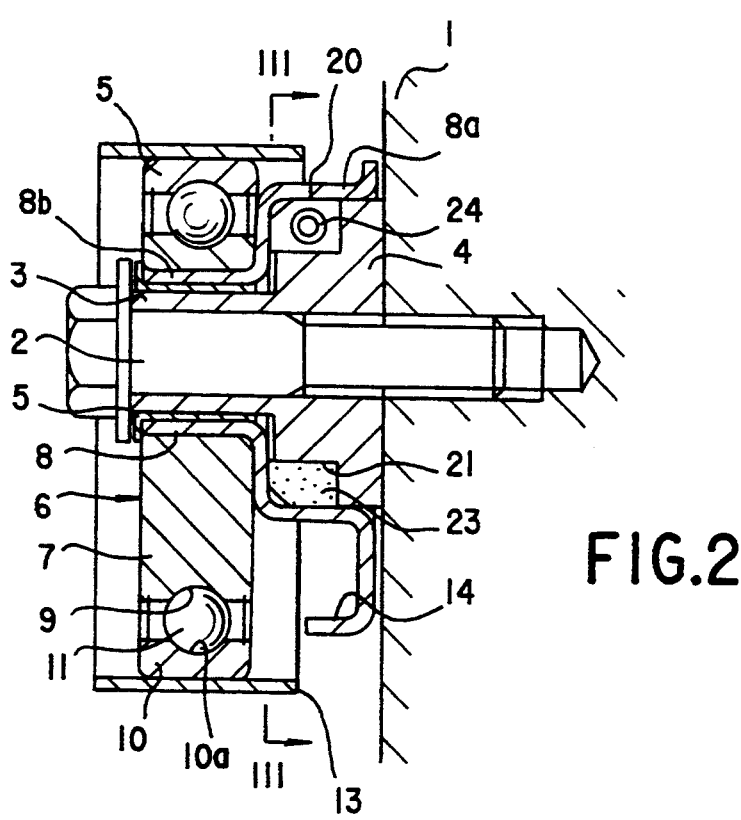

AUTOTENSIONER

TECHNICAL FIELD

This invention relates to an autotensioner used to keep constant the tension of a timing belt for driving the cam shaft of an automobile engine or the like.

BACKGROUND TECHNOLOGY

An autotensioner used to keep constant the tension of the belt for driving the camshaft of an automobile engine is proposed in Unexamined Japanese Utility Model Publication 1-171952.

In this type of autotensioner, as shown in FIG. 6, a support shaft 32 is fixed by tightening a bolt 31 into a base 30 of the engine block. A pulley support 33 is eccentrically supported on the support shaft 32. A pulley 35 is rotatably mounted on the pulley support 33 through a rolling contact bearing 34. The pulley support 33 is provided with a cylindrical portion 36 concentrical with the support shaft 32. A bracket 37 press-fitted on the cylindrical portion 36 has an arm 38 to which a tension adjusting spring 39 is coupled in order to rock the pulley support 33 in a direction in which the pulley 35 stretches the belt.

Further, between the cylindrical portion 36 and the support shaft 32 is provided a damper mechanism 40 in the form of viscous fluid so that it will impart a rocking resistance to the pulley support 33 and prevent a high-frequency fluctuation.

In this conventional autotensioner, as shown in FIG. 7, the pulley support 33 including the cylindrical portion 36 is in the form of an eccentric cylinder having two different central axes a and b. Thus, it requires a lot of manufacturing time and cost.

A technical object of the present invention is to obviate the abovesaid problems and to simplify the manufacturing process of the pulley support of the autotensioner and to reduce the cost.

DISCLOSURE OF THE INVENTION

In order to attain the above object, according to the present invention, there is provided an autotensioner comprising a support shaft, a pulley support eccentrically supported by the support shaft, a pulley rotatably supported by the pulley support, a tension imparting means for urging the pulley support in a direction in which the pulley stretches a belt, the pulley support having a cylindrical portion which is concentrical with the support shaft, and damper means disposed between the cylindrical portion and the support shaft for imparting a rocking resistance to the pulley support, characterized in that the pulley support comprises an eccentric ring and a rocking shaft, the eccentric ring has the inner periphery thereof eccentric with respect to the outer periphery thereof, and the rocking shaft is provided at one end thereof with the cylindrical portion and is integrally provided at the other end thereof with a cylindrical small-diameter portion which is inserted in the eccentric ring so as not to rotate relative to the eccentric ring.

As described above, the pulley shaft is divided into two separate parts, i.e. the eccentric ring and the rocking shaft. By assembling these two simple parts, the pulley support having two central axes can be manufactured. Thus, each part can be manufactured easily and thus the manufacturing cost can be reduced.

BRIEF DESCRIPTION OF THE DRAWINGS

FIG. 1 is a front view showing one embodiment of the autotensioner according to the present invention;

FIG. 2 is a vertical sectional side view of the same;

BEST MODE FOR EMBODYING THE INVENTION

Figure 3:
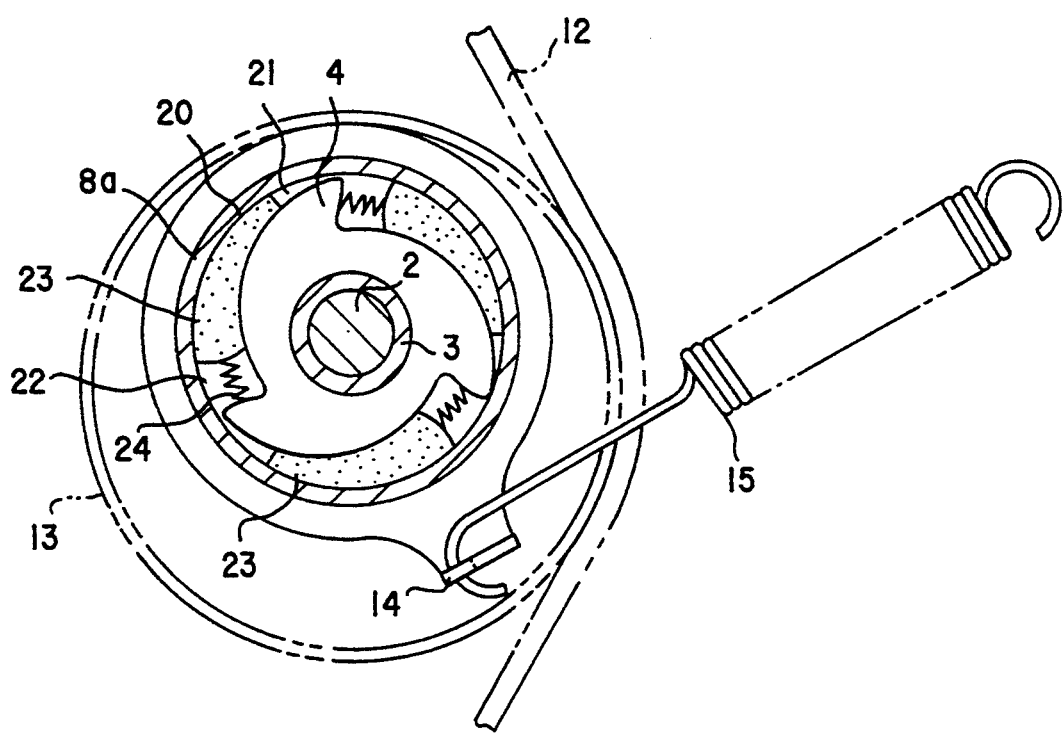
FIG. 3 is a sectional side view taken along line III—III of FIG. 2.

Now we shall explain the embodiments with reference to FIGS. 1-5.

FIGS. 1-4 show an autotensioner used to adjust the tension of a cam shaft driving belt of an automobile engine. As shown, to one side of an engine block 1, a cylindrical support shaft 3 is fixed by tightening a bolt 2.

A support shaft 3 has a large-diameter portion 4 at one end thereof near the engine block 1. On the support shaft 3 is rotatably and eccentrically supported a pulley support 6 through a bearing 5.

The pulley support 6 comprises an eccentric ring 7 and a rocking shaft 8 secured thereto. The axis of the inner diameter of the eccentric ring 7 is eccentric with respect to the axis of the outer diameter thereof. At one end of the rocking shaft 8 is formed a cylindrical portion 8a which is mounted on the large-diameter portion 4. The rocking shaft 8 is integrally formed at the other end with a cylindrical small-diameter portion 8b rotatably supported by the bearing 5. The small-diameter portion 8b is press-fitted not to rotate relative to the eccentric ring 7.

In order to insure that the small-diameter portion 8b will not rotate relative to the eccentric ring 7, a serration may be provided on the inner periphery of the eccentric ring 7 and/or on the outer periphery of the small-diameter portion 8b.

A raceway groove 9 is formed in the outer periphery of the eccentric ring 7. An outer ring 10 is formed with a raceway groove 9a. Between the raceway grooves 9 and 10a are mounted a plurality of balls 11. A pulley 13 is mounted on the outer ring 10 to impart the tension to a belt 12.

A coupling piece 14 is integrally formed on the cylindrical portion 8a of the rocking shaft 8. A tension adjusting spring 15 as a tension imparting means is coupled to the coupling piece 14. Thus, the tension adjusting spring 15 tends to rock the pulley support 6 in a direction in which the pulley 13 stretches the belt 12.

Between the cylindrical portion 8a of the rocking shaft 8 and the large-diameter portion 4 of the support shaft 3 is provided a damper mechanism 20 to restrict a high-frequency fluctuation of the belt 12 by imparting the rocking resistance to the pulley support 6.

The damper mechanism 20 comprises a plurality of inclined cam surfaces 21 formed on the outer periphery of the large-diameter portion 4, wedge-shaped spaces 22 defined between the cam surfaces 21 and the cylindrical inner surface of the cylindrical portion 8a, friction members 23 having the same contour as the wedge-shaped spaces 22, and springs 24 for urging the friction members 23 toward the narrower portion of each wedge-shaped space 22, the friction members 23 and the springs 24 being mounted in the wedge-shaped spaces.

In the damper mechanism 20, when the tension of the belt 12 increases and the belt presses the pulley 13, the friction members 23 are pushed into the narrower portion of the respective wedge-shaped spaces 22 by contact with the cylindrical portion 8a. Thus, the friction between the friction members 23 and the cylindrical portion 8a increases.

On the other hand, if the tension of the belt 12 decreases, the friction members 23 are moved toward the wider portion of the wedge-shaped spaces 22 due to the contact with the cylindrical portion 8a. Thus, the friction between the portion 8a and the friction member 23 decreases. As a result, to the pivot movement of the pulley support 6, which serves to adjust the tension of the belt 12, a directional frictional resistance is imparted.

Figure 4:
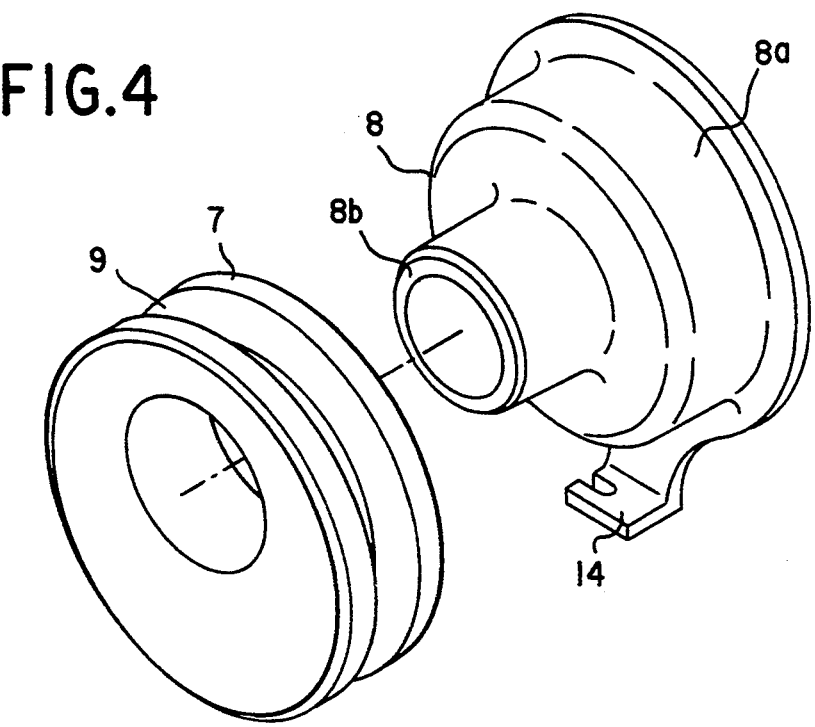
FIG. 4 is an exploded perspective view showing the pulley support of the same.

With this structure, as shown in FIG. 4, the pulley support 6 is formed so as to comprise the eccentric ring 7 and the rocking shaft 8. Furthermore, the rocking shaft 8 has a simple structure in which the cylindrical portion 8a is provided at one end thereof and the cylindrical small-diameter portion 8b is concentrically formed at the other end thereof. Thus, an inexpensive method such as pressing the metal plate can be employed to manufacture the rocking shaft. Thus, the cost can be reduced.

Figure 5:
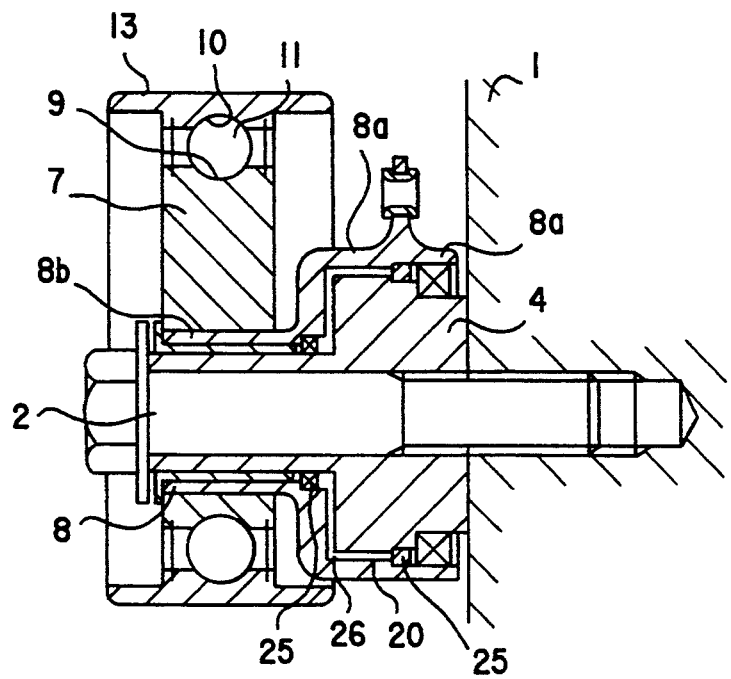
FIG. 5 is a vertical sectional side view showing another embodiment of the autotensioner according to the present invention.
Figure 6:
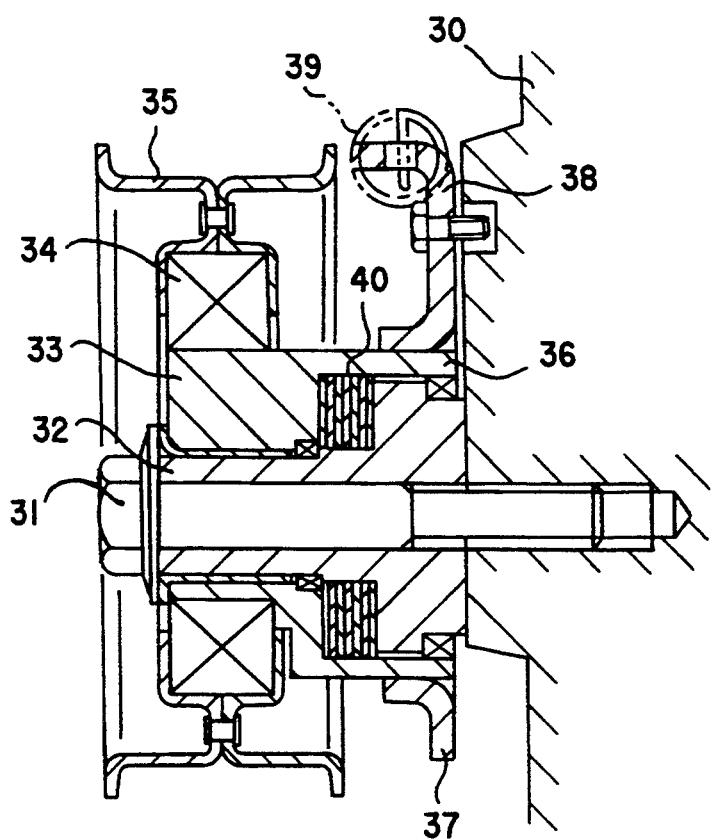
FIG. 6 is a vertical sectional side view showing a conventional autotensioner.
Figure 7:
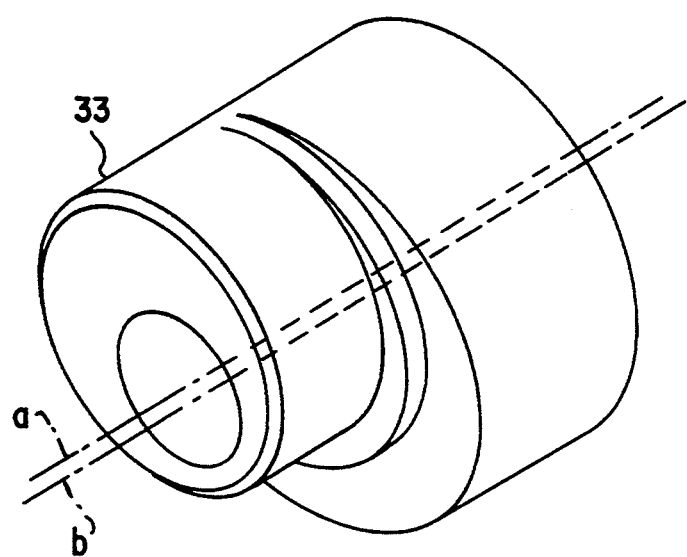
FIG. 7 is a perspective view showing the pulley support of the same.

FIG. 5 shows another embodiment according to the present invention. In this embodiment, raceway grooves 9 and 10 are provided on the outer periphery of the eccentric ring 7 and on the inner periphery of the pulley 13, respectively. A plurality of balls 11 are mounted between the raceway grooves 9 and 10 so as to rotatably support the pulley.

Also, between the cylindrical portion 8a of the rocking shaft 8 and the large-diameter portion 4 is provided a space 26 sealed by a pair of seals 25. A viscous fluid is filled in the space 26 to form a damper mechanism 20 to impart the rocking resistance to the pulley support 6.

In this embodiment, since the outer ring 10 in FIG. 2 is omitted, it is possible to reduce the outer diameter of the pulley 13. On the contrary, if the outer diameter of the pulley 13 has the same dimension as the pulley 13 of FIG. 2, the eccentric amount of the central axis of the inner diameter of the eccentric ring 7 with respect to that of the outer diameter can be set larger. This is advantageous in increasing the rocking amount of the pulley 13.

As described above, in the autotensioner according to the present invention, the pulley support comprises an eccentric ring and a rocking shaft. Thus, by assembling the eccentric ring and the rocking shaft of simple shape, the pulley support having two central axes can be formed. Therefore, the parts can be manufactured with simple steps and the cost can be reduced.

Moreover, the coupling piece for imparting a resilient force of the tension imparting means is integrally formed with a cylindrical portion of the rocking shaft. Thus, compared with the conventional autotensioner in which the resilient force of the tension imparting means is transmitted to the coupling piece of the bracket mounted in the cylindrical portion of the pulley support, the resilient force of the tension adjusting means can be transmitted to the pulley support more reliably. Further, the number of parts and the cost can be reduced.

We claim:

1. An autotensioner comprising a support shaft, a pulley support eccentrically supported by said support shaft, a pulley rotatably supported by said pulley support, a tension imparting means for urging said pulley support in a direction in which said pulley stretches a belt, said pulley support having a cylindrical portion which is concentrical with said support shaft, and damper means disposed between said cylindrical portion and said support shaft for imparting a rocking resistance to said pulley support, characterized in that said pulley support comprises an eccentric ring and a rocking shaft, said eccentric ring has the inner periphery thereof eccentric with respect to the outer periphery thereof, and said rocking shaft is provided at one end thereof with said cylindrical portion and is integrally provided at the other end thereof with a cylindrical small-diameter portion which is inserted in said eccentric ring so as not to rotate relative to said eccentric ring.

2. An autotensioner as claimed in claim 1 wherein said tension imparting means is in the form of a tension adjusting spring, and said cylindrical portion of said rocking shaft is formed with a coupling piece to which said tension adjusting spring is coupled.

* * * * *